(12) United States Patent
Tsukada et al.

(10) Patent No.: US 7,497,288 B2
(45) Date of Patent: Mar. 3, 2009

(54) MOTOR COOLING STRUCTURE FOR ELECTRIC VEHICLE

(75) Inventors: Yoshiaki Tsukada, Saitama (JP); Takashi Ozeki, Saitama (JP); Akihiro Iimuro, Saitama (JP); Tomomi Ishikawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 586 days.

(21) Appl. No.: 11/169,897

(22) Filed: Jun. 30, 2005

(65) Prior Publication Data

US 2006/0027192 A1    Feb. 9, 2006

(30) Foreign Application Priority Data

Aug. 5, 2004    (JP)    ............................. 2004-229416

(51) Int. Cl.
B60K 1/00    (2006.01)
(52) U.S. Cl. ..................................... 180/68.1; 180/68.2
(58) Field of Classification Search ................ 180/68.1, 180/68.2, 229, 65.1, 908, 65.5, 65.6, 220
See application file for complete search history.

(56) References Cited

U.S. PATENT DOCUMENTS

| | | | | |
|---|---|---|---|---|
| 4,465,948 A | * | 8/1984 | Oyama et al. | 310/62 |
| 5,222,572 A | * | 6/1993 | Yamagiwa et al. | 180/220 |
| 5,501,292 A | * | 3/1996 | Kawashima et al. | 180/220 |
| 5,561,359 A | * | 10/1996 | Matsuura et al. | 180/68.2 |
| 5,613,569 A | | 3/1997 | Sugioka et al. | |
| 6,078,115 A | * | 6/2000 | Uchida et al. | 310/58 |
| 6,087,746 A | * | 7/2000 | Couvert et al. | 310/60 R |
| 6,837,322 B2 | * | 1/2005 | Jurado et al. | 180/65.4 |
| 7,249,644 B2 | * | 7/2007 | Honda et al. | 180/65.5 |

FOREIGN PATENT DOCUMENTS

JP    62-16530 Y2    4/1987

* cited by examiner

Primary Examiner—Christopher P Ellis
Assistant Examiner—Brian Swenson
(74) Attorney, Agent, or Firm—Birch, Stewart, Kolasch & Birch, LLP

(57) ABSTRACT

A motor cooling structure for efficiently cooling a driving motor in a power unit case of the electric vehicle includes a transmission case cover having an air filter mounted on a side surface of a transmission case adjacent to a fan, and a ventilation gap defined between a rear portion of the transmission case cover and the transmission case. The transmission case cover includes a cooling air inlet facing the ventilation gap. When the fan is rotated in synchronism with a crankshaft, an outside cooling air is introduced from the cooling air inlet into the transmission case cover and then passes through the air filter to enter the transmission case, thereby forcibly cooling a transmission. Thereafter, a part of the cooling air is discharged from a central air outlet to the outside of the transmission case, and the remaining cooling air is drawn to the driven portion of the transmission.

17 Claims, 6 Drawing Sheets

7: CONTROL UNIT

20: ENGINE

21a: ACG STARTER MOTOR

21b: DRIVING MOTOR

40: STARTING CLUTCH

54b: FAN

77: SHIFTING MOTOR

23: CVT

44: ONE-WAY CLUTCH

69: SPEED REDUCING MECHANISM

74: BATTERY

WR: REAR WHEEL

MOTOR COOLING STRUCTURE FOR ELECTRIC VEHICLE

CROSS-REFERENCE TO RELATED APPLICATION

The present application claims priority under 35 U.S.C. §119 to Japanese Patent Application No. 2004-229416, filed Aug. 5, 2004, the entire contents of which are hereby incorporated by reference.

BACKGROUND OF THE INVENTION

1. Field of the Invention

The present invention relates to a motor cooling structure for an electric vehicle using a driving motor as a power source or an auxiliary power source for running.

2. Description of Background Art

An electric vehicle using an electric motor as a power source has various advantages such that no air pollution occurs, noise pollution is suppressed, and acceleration/deceleration response is better as compared with a conventional automobile using an engine as a power source. However, at present, the electric vehicle also has various disadvantages, including a cruising distance that is short because of the limit of a battery capacity, and the cost per mileage of the unit energy is high causing low economy. A hybrid type electric vehicle is a vehicle capable of compensating for the disadvantages of such an electric vehicle driven by only an electric motor. Since a hybrid type electric vehicle has both an electric motor and an internal combustion engine, it also has the advantages of the electric vehicle and has now been put into practical use.

In vehicles having a belt type continuously variable transmission accommodated in a power unit case, the temperature inside the power unit case rises because of a frictional heat between a drive pulley and a belt and between a driven pulley and the belt. Japanese Patent Laid-open No. Sho 62-16530, for example, discloses a cooling structure for efficiently introducing an outside cooling air into a power unit case to lower the temperature inside the power unit case.

In an electric vehicle, a driving motor having a large calorific value is accommodated with a belt type continuously variable transmission in the power unit case. However, the above-mentioned conventional cooling structure is adapted to a power unit for a vehicle having an engine with a relatively small calorific value, because a heat source is limited to a transmission and a starter motor. Accordingly, if this conventional cooling structure is applied, without any changes, to an electric vehicle having a large calorific value, it is difficult to sufficiently cool the inside of the power unit case.

SUMMARY AND OBJECTS OF THE INVENTION

It is accordingly an object of the present invention to provide a motor cooling structure for an electric vehicle which can efficiently cool a driving motor in a power unit case of the electric vehicle.

The motor cooling structure for an electric vehicle of the present invention includes that following aspects.

According to a first aspect of the present invention, the motor cooling structure for an electric vehicle includes a driving motor connected to a drive wheel; a power unit case accommodating the driving motor and a power transmitting mechanism therefor; an air inlet for introducing an outside air as a cooling air into the power unit case; and an air outlet provided in the vicinity of the driving motor. The air inlet and the air outlet are in communication with each other through a gap between a stator and a rotor of the driving motor.

According to a second aspect of the present invention, the air outlet is located in a projected area of the driving motor as viewed in side elevation of the vehicle.

According to a third aspect of the present invention, the motor cooling structure also includes a cover member for covering the air outlet with a predetermined gap defined therebetween.

According to a fourth aspect of the present invention, the power unit case accommodates a continuously variable transmission having a drive pulley, a driven pulley, and an endless belt wrapped between the drive pulley and the driven pulley; an air intake fan provided coaxially with the drive pulley; and a drive shaft coaxially connecting the driving motor and the driven pulley. The air inlet is provided in the vicinity of the air intake fan.

According to a fifth aspect of the present invention, the motor cooling structure for an electric vehicle includes an outer rotor type motor with a stator and a rotor arranged around the stator; and a fan coaxially connected to the rotor in axially opposed relationship with a yoke of the rotor; a predetermined gap being defined between the yoke and the fan.

According to a first aspect of the present invention, the yoke of the rotor is formed with a vent hole.

According to the present invention, the following effects can be exhibited.

According to the first aspect of the invention, the driving motor can be efficiently cooled. Accordingly, a cooling fan can be reduced in size, and a temperature rise in the power unit case can also be suppressed to thereby improve the durability of a continuously variable transmission provided in the power unit case.

According to the second aspect of the invention, the heat generated from the stator of the driving motor can be efficiently dissipated from the side surface of the vehicle.

According to the third aspect of the invention, the entry of mud and water from the outside of the vehicle into the power unit case can be prevented, and the heat in the power unit case can be efficiently dissipated to the outside of the vehicle.

According to the fourth aspect of the invention, not only the drive pulley of the continuously variable transmission, but also the belt and the driven pulley of the continuously variable transmission can be cooled by only the air intake fan provided near the drive pulley of the continuously variable transmission.

According to the fifth aspect of the invention, a ventilation passage is formed by the predetermined gap between the yoke of the outer rotor and the fan. Accordingly, the outer rotor type motor can be efficiently cooled.

According to the sixth aspect of the invention, the heat generated from the stator of the outer rotor type motor is dissipated from the vent hole of the rotor yoke through the ventilation passage formed between the rotor yoke and the fan to the outside of the vehicle. Accordingly, the outer rotor type motor can be cooled more efficiently.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
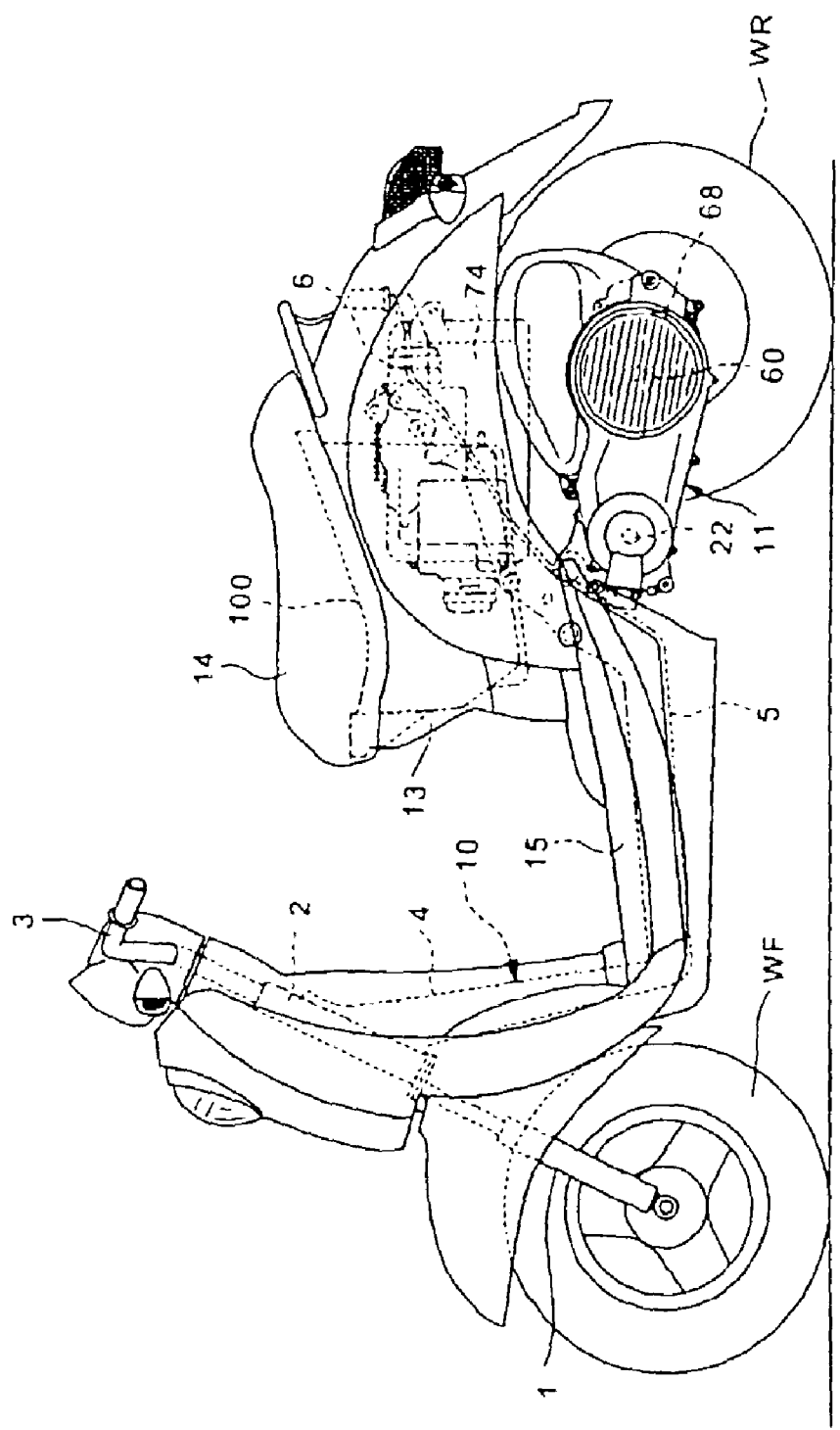
FIG. 1 is a side view of a motorcycle showing a preferred embodiment of the hybrid vehicle according to the present invention.

FIG. 1 is a side view of a preferred embodiment of a scooter type hybrid vehicle to which the motor cooling structure of the present invention is applied.

The hybrid vehicle has a front fork 1 for rotatably supporting a front wheel WF at a front portion of a vehicle body. The front fork 1 is pivotably supported to a head pipe 2 so as to be steerable by the operation of a steering handle 3. A down pipe 4 is mounted on the head pipe 2 so as to extend rearward and downward therefrom. An intermediate frame 5 extends substantially horizontally from the lower end of the down pipe 4. A rear frame 6 extends rearward and upward from the rear end of the intermediate frame 5.

Thus, the head pipe 2, the down pipe 4, the intermediate frame 5, and the rear frame 6 constitute a body frame 10. A power unit 11 including an engine and a motor as power sources and a power transmitting mechanism is pivotably mounted at one end thereof to the body frame 10. A rear wheel WR as a drive wheel is rotatably mounted at the other end of the power unit 11 at a rear portion thereof. A rear cushion (not shown) is mounted on the rear frame 6, and the power unit 11 is suspended by the rear cushion.

The body frame 10 is surrounded by a body cover 13. A rider's seat 14 is fixed to the upper surface of the body cover 13 at a rear portion thereof. A step floor 15 as a footrest for the rider is formed on the front side of the seat 14. A luggage box 100 functioning as a utility space for accommodating a helmet, luggage, etc. is formed under the seat 14.

Figure 2:
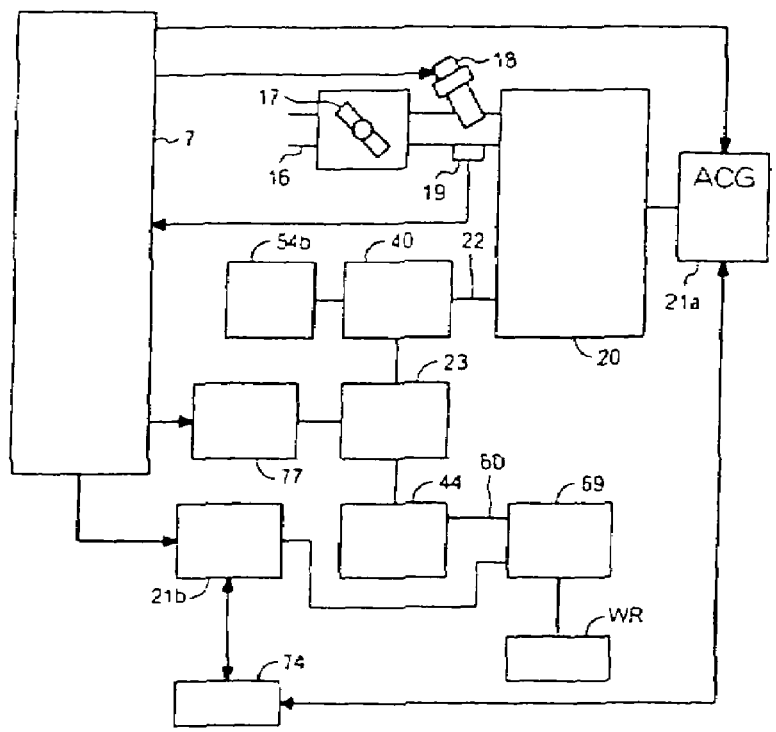
FIG. 2 is a block diagram showing a system configuration of the motorcycle shown in FIG. 1.

FIG. 2 is a block diagram showing a system configuration of the hybrid vehicle mentioned above. The power unit 11 includes an engine 20, an ACG starter motor 21a functioning as an engine starter and a generator, a continuously variable transmission (power transmitting means) 23 connected to a crankshaft 22 for transmitting power of the engine 20 to the rear wheel WR, a shifting motor 77 for changing a speed ratio in the continuously variable transmission (CVT) 23, a starting clutch 40 for engaging or disengaging the transmission of power between the crankshaft 22 and an input shaft of the CVT 23, a driving motor 21b functioning as a motor and a generator, a one-way clutch 44 allowing the transmission of power from the engine 20 or the driving motor 21b to the rear wheel WR and inhibiting the transmission of power from the rear wheel WR to the engine 20, and a speed reducing mechanism 69 for reducing the speed of a drive shaft 60 as an output shaft of the CVT 23 to transmit the torque of the drive shaft 60 to the rear wheel WR. These members of the power unit 11 are accommodated in a power unit case.

The power of the engine 20 is transmitted from the crankshaft 22 through the starting clutch 40, the CVT 23, the one-way clutch 44, the drive shaft 60, and the speed reducing mechanism 69 to the rear wheel WR. On the other hand, the power of the driving motor 21b is transmitted through the drive shaft 60 and the speed reducing mechanism 69 to the rear wheel WR. Thus, the drive shaft 60 serves also as an output shaft of the driving motor 21b in this preferred embodiment.

A battery 74 is connected to the ACG starter motor 21a and the driving motor 21b. In the case that the driving motor 21b functions as a motor and that the ACG starter motor 21a functions as a starter, electric power is supplied from the battery 74 to these motors 21a and 21b, whereas in the case that the ACG starter motor 21a and the driving motor 21b function as generators, regenerative power of these motors 21a and 21b is charged into the battery 74.

A throttle valve 17 for controlling the flow of intake air is pivotably provided in an intake pipe 16 of the engine 20. The throttle valve 17 is pivotally moved according to the amount of operation of a throttle grip (not shown) operated by the rider. An injector 18 for injecting fuel and a vacuum sensor 19 for detecting a vacuum in the intake pipe 16 are provided between the throttle valve 17 and the engine 20.

Figure 3:
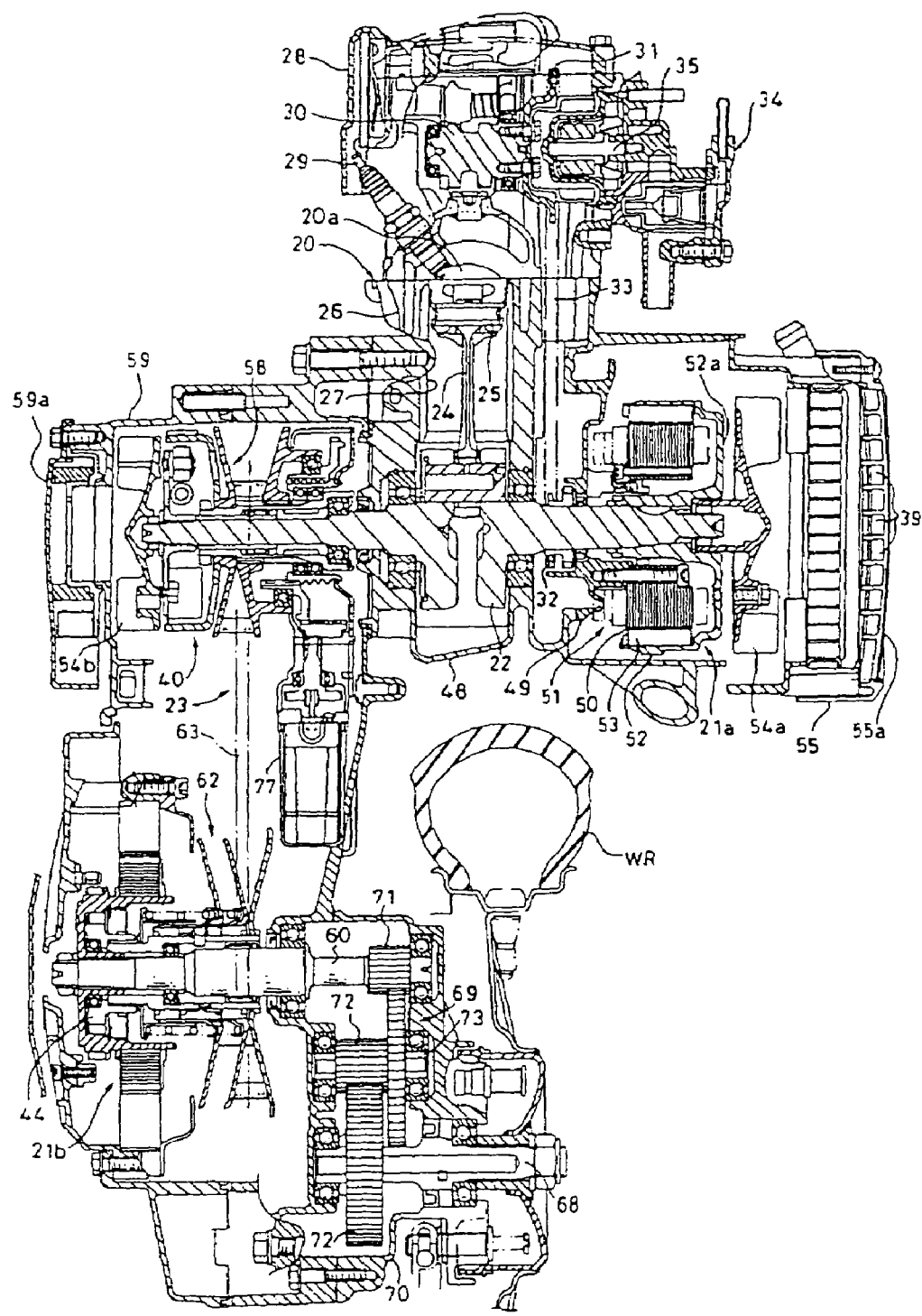
FIG. 3 is a sectional view of a power unit in the motorcycle shown in FIG. 1.

The configuration of the power unit 11 including the internal combustion engine 20 and the driving motor 21b will now be described with reference to FIG. 3.

The engine 20 includes a piston 25 connected through a connecting rod 24 to the crankshaft 22. The piston 25 is slidably fitted in a cylinder 27 formed in a cylinder block 26. The cylinder block 26 is arranged so that the axis of the cylinder 27 extends substantially horizontally in the longitudinal direction of the vehicle. A cylinder head 28 is fixed to the front surface of the cylinder block 26. A combustion chamber 20a for effecting the combustion of an air-fuel mixture therein is formed by the cylinder head 28, the cylinder 27, and the piston 25 in combination.

The cylinder head 28 is provided with a valve (not shown) for controlling the intake of the air-fuel mixture into the combustion chamber 20a or the exhaust of burned gases therefrom. The cylinder head 28 is further provided with a spark plug 29. The opening and closing operation of the valve is controlled by the rotation of a camshaft 30 supported to the cylinder head 28. A driven sprocket 31 is mounted on the camshaft 30 at one end thereof, and a drive sprocket 32 is mounted on the crankshaft 22. An endless cam chain 33 is wrapped between the driven sprocket 31 and the drive sprocket 32. A water pump 34 for cooling the engine 20 is also mounted at one end of the camshaft 30. The water pump 34 has a rotating shaft 35 integrated with the camshaft 30. Accordingly, the water pump 34 can be operated by rotating the camshaft 30.

The crankshaft 22 is supported to a crankcase 48 forming a part of the power unit case. A stator case 49 is connected to the right side surface of the crankcase 48 in the lateral direction of the vehicle, and the ACG starter motor 21a is accommodated in the stator case 49. which has a stator 51 including a coil 50 formed by winding a conductor around teeth fixed to the stator case 49.

The ACG starter motor 21a further has an outer rotor 52 fixed to the crankshaft 22. The outer rotor 52 has a substantially cylindrical shape so as to surround the stator 51. A magnet 53 is provided on the inner circumferential surface of the outer rotor 52. A fan 54a for cooling the ACG starter motor 21a is mounted on the right end of the crankshaft 22 in the lateral direction of the vehicle in such a manner that a ventilation gap d is defined between the fan 54a and a yoke 52a of the outer rotor 52. A cover 55 having a side surface 55a is mounted on the stator case 49. The side surface 55a of the cover 55 is formed with a cooling air inlet 39 for introducing a cooling air into the power unit case by rotating the fan 54a in synchronism with the crankshaft 22.

A transmission case 59 forming a part of the power unit case is connected to the left side surface of the crankcase 48 in the lateral direction of the vehicle. A fan 54b is fixed to the left end of the crankshaft 22. The fan 54b, the CVT 23 connected at its driving portion through the starting clutch 40 to the crankshaft 22, and the driving motor 21b connected to the driven portion of the CVT 23 are accommodated in the transmission case 59. The fan 54b functions to cool the CVT 23 and the driving motor 21b accommodated in the transmission case 59. The fan 54b is located on the same side as that of the driving motor 21b with respect to the CVT 23, that is, both the fan 54b and the driving motor 21b are located on the left side of the CVT 23 in the lateral direction of the vehicle.

The CVT 23 is a belt converter composed generally of a drive pulley 58, a driven pulley 62, and an endless V-belt (endless belt) 63 wrapped between the drive pulley 58 and the driven pulley 62. The drive pulley 58 is mounted through the starting clutch 40 to a left end portion of the crankshaft 22 projecting from the crankcase 48 in the lateral direction of the vehicle. The driven pulley 62 is mounted through the one-way clutch 44 to the drive shaft 60 supported to the transmission case 59. The drive shaft 60 has an axis parallel to the axis of the crankshaft 22.

Figure 4:
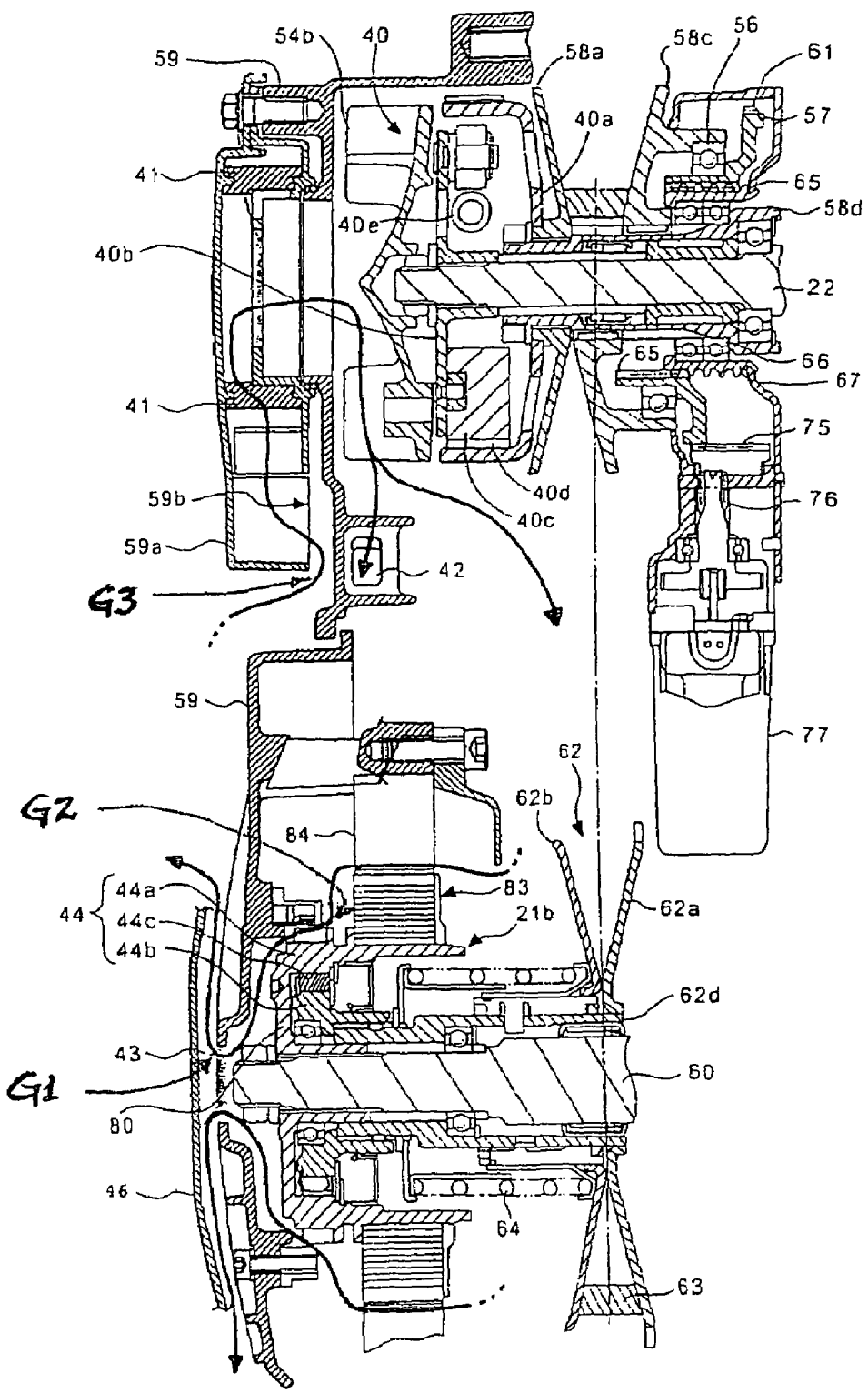
FIG. 4 is an enlarged view of an essential part shown in FIG. 3.

As shown in FIG. 4, the drive pulley 58 includes a sleeve 58d relatively rotatably mounted on the crankshaft 22, a fixed pulley member 58a fixedly mounted on the sleeve 58d so as to be axially nonslidable, and a movable pulley member 58c axially slidably mounted on the sleeve 58d so as to be nonrotatable relative thereto. A shifting ring 57 is rotatably mounted through a bearing 56 to the movable pulley member 58c.

The shifting ring 57 has a large-diameter portion whose outer circumference is formed with a gear 61, and a cylindrical small-diameter portion whose inner circumference is formed with an axially extending trapezoidal screw thread 65. The trapezoidal screw thread 65 is in mesh with a trapezoidal screw threaded member 67 relatively rotatably mounted through a bearing 66 to the sleeve 58d so as to be axially nonslidable. The gear 61 of the shifting ring 57 is in mesh with a worm wheel 75. The worm wheel 75 is in mesh with a worm gear 76 connected to a rotating shaft of the shifting motor 77 for controlling a speed ratio in the CVT 23.

On the other hand, the driven pulley 62 includes a sleeve 62d relatively rotatably mounted on the drive shaft 60, a fixed pulley member 62a fixedly mounted on the sleeve 62d so as to be axially nonslidable, and a movable pulley member 62b axially slidably mounted on the sleeve 62d.

A sectionally V-shaped groove is formed between the fixed pulley member 58a and the movable pulley member 58c of the drive pulley 58, and a similar sectionally V-shaped groove is formed between the fixed pulley member 62a and the movable pulley member 62b of the driven pulley 62. The endless V-belt 63 is fitted with these sectionally V-shaped grooves of the drive and driven pulleys 58 and 62. A spring (elastic member) 64 for normally biasing the movable pulley member 62b toward the fixed pulley member 62a is provided on the back side of the movable pulley member 62b (on the left side of the movable pulley member 62b in the lateral direction of the vehicle).

In changing a speed ratio in the CVT 23, the shifting motor 77 is driven in a direction according to a shift-up/down operation. A drive force generated by the shifting motor 77 is transmitted through the worm gear 76 and the worm wheel 75 to the gear 61 of the shifting ring 57, thereby rotating the shifting ring 57. The shifting ring 57 is operatively engaged with the sleeve 58d through the trapezoidal screw threads 65 and 67. Accordingly, in the case when the rotational direction of the shifting ring 57 corresponds to a shift-up operational direction, the shifting ring 57 is moved axially leftward along the crankshaft 22 as viewed in FIG. 4, so that the movable pulley member 58c slides on the sleeve 58d toward the fixed pulley member 58a.

Accordingly, the movable pulley member 58c approaches the fixed pulley member 58a by an amount corresponding to the sliding movement of the movable pulley member 58c, so that the width of the V-shaped groove of the drive pulley 58 is decreased. Therefore, the contact position of the V-belt 63 to the drive pulley 58 is shifted radially outward of the drive pulley 58, so that the wrapping radius of the V-belt 63 in the drive pulley 58 is increased. In concert therewith, the width of the V-shaped groove formed between the fixed pulley member 62a and the movable pulley member 62b of the driven pulley 62 is increased by the operation of the V-belt 63, so that the wrapping radius of the V-belt 63 in the driven pulley 62 is increased. Thus, the wrapping radius of the V-belt 63 (transmission pitch radius) continuously varies according to the rotational speed of the crankshaft 22, thereby changing the speed ratio automatically and steplessly.

The starting clutch 40 includes a cuplike outer case 40a fixed to the sleeve 58d, an outer plate 40b fixed to the crankshaft 22 at a left end portion thereof, a shoe 40d mounted through a weight 40c to an outer circumferential portion of the outer plate 40b so as to face radially outward, and a spring 40e for biasing the shoe 40d in the radially inward direction.

When the engine speed, or the rotational speed of the crankshaft 22 is less than or equal to a predetermined value (e.g., 3000 rpm), the power transmission between the crankshaft 22 and the CVT 23 is cut off by the starting clutch 40. When the engine speed is increased to become greater than the above predetermined value, a centrifugal force acting on the weight 40c overcomes an elastic force of the spring 40e biasing the weight 40c radially inward, so that the weight 40c is moved radially outward to thereby press the shoe 40d against the inner circumferential surface of the outer case 40a with a force not less than a predetermined value. Accordingly, the rotation of the crankshaft 22 is transmitted through the outer case 40a to the sleeve 58d, thereby driving the drive pulley 58 rotating with the sleeve 58d.

The one-way clutch 44 includes a cup-shaped outer clutch member 44a, an inner clutch member 44b coaxially inserted in the outer clutch member 44a, and a roller 44c allowing the power transmission in only one direction from the inner clutch member 44b to the outer clutch member 44a. The outer clutch member 44a serves also as an inner rotor body of the driving motor 21b, that is, the outer clutch member 44a is integrally formed with the inner rotor body. The outer clutch member 44a has a central hub portion splined with the drive shaft 60.

The power transmitted from the engine 20 to the driven pulley 62 of the CVT 23 is transmitted through the fixed pulley member 62a, the inner clutch member 44b, the outer clutch member 44a or the inner rotor body, the drive shaft 60, and the speed reducing mechanism 69 to the rear wheel WR. On the other hand, the power from the rear wheel WR in walking with the vehicle or in the regenerative operation is transmitted through the speed reducing mechanism 69 and the drive shaft 60 to the inner rotor body or the outer clutch member 44a. However, this power is not transmitted to the CVT 23 and the engine 20 because the outer clutch member 44a idly rotates relative to the inner clutch member 44b.

Referring back to FIG. 3, the speed reducing mechanism 69 is provided in a gear case 70 connected to the right side surface of the transmission case 59 at its rear end portion. The speed reducing mechanism 69 includes an intermediate shaft 73 supported to the gear case 70 and the transmission case 59 in parallel relationship with the drive shaft 60 and an axle 68 of the rear wheel WR, a first reduction gear pair 71 formed at a right end portion of the drive shaft 60 and a right portion of the intermediate shaft 73, and a second reduction gear pair 72 formed at a left portion of the intermediate shaft 73 and a left end portion of the axle 68. With this arrangement, the rotational speed of the drive shaft 60 is reduced at a predetermined reduction gear ratio, and the rotation thereof is transmitted to the axle 68 supported to the gear case 70 and the transmission case 59 in parallel relationship with the drive shaft 60.

Figure 5:
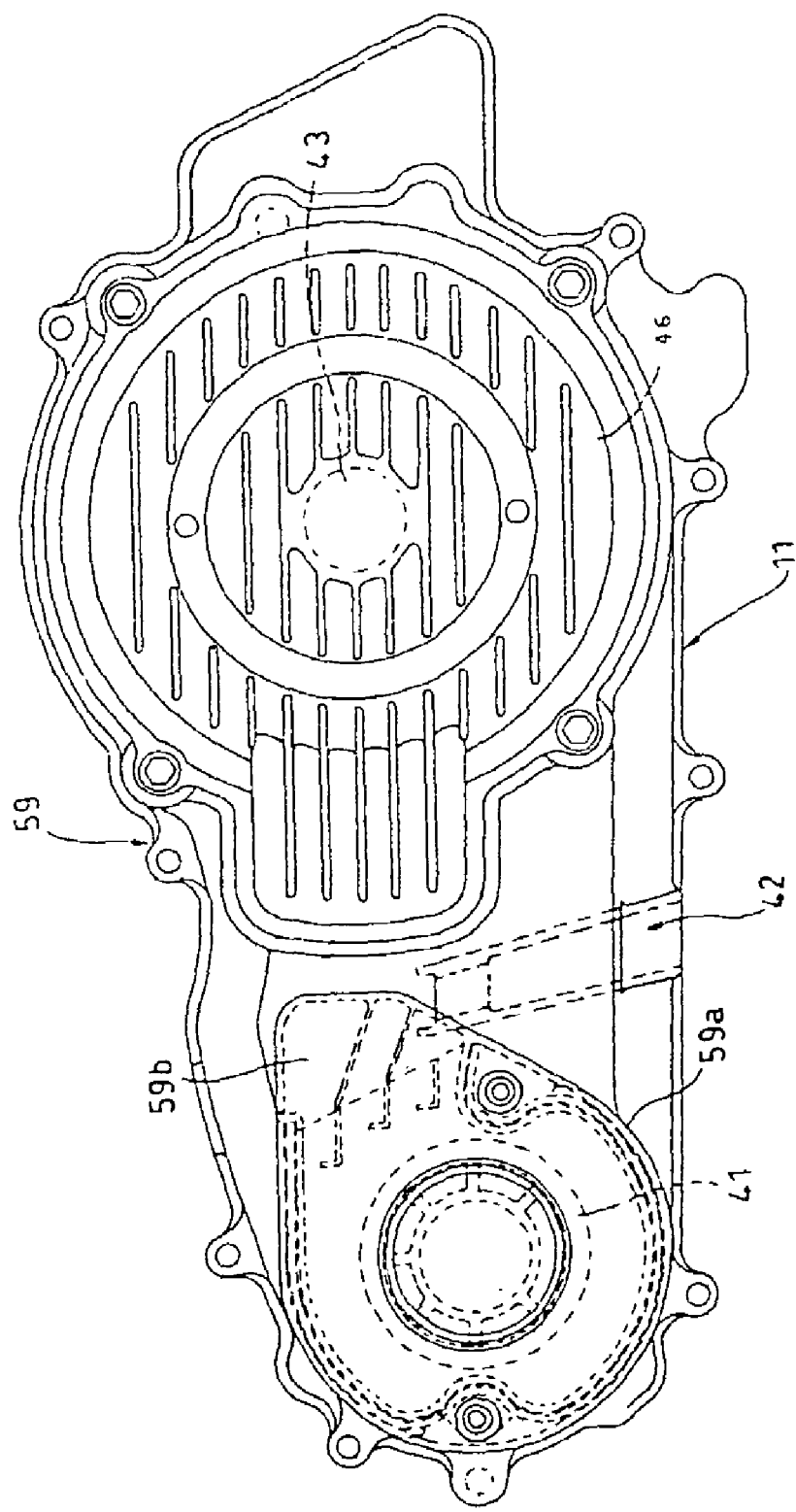
FIG. 5 is a side view of FIG. 4.

The cooling structure in this preferred embodiment will now be described with reference to FIGS. 4, 5, and 6. FIG. 5 is a side view of the power unit 11 as viewed from the left side of the vehicle, and FIG. 6 is an enlarged sectional view of an essential part near the ACG starter motor 21a.

As shown in FIGS. 4 and 5, a transmission case cover 59a having an air filter 41 is mounted on the left side surface of the transmission case 59 at a portion adjacent to the fan 54b, and a ventilation gap G3 is defined between a rear portion of the transmission case cover 59a and the transmission case 59. The transmission case cover 59a is formed with a cooling air inlet 59b facing the above-mentioned ventilation gap G3. When the fan 54b is rotated in synchronism with the crankshaft 22, an outside cooling air is introduced from the cooling air inlet 59b into the transmission case cover 59a and is then passed through the air filter 41 to enter the transmission case 59, thereby forcibly cooling the CVT 23. Thereafter, a part of the cooling air introduced into the transmission case 59 is discharged from a central air outlet 42 to the outside of the transmission case 59, and the remaining cooling air is drawn to the driven portion of the CVT 23.

The left side surface of the transmission case 59 at a portion adjacent to the driving motor 21b is formed with an air outlet 43, and a transmission case cover 46 is mounted on the left side surface of the transmission case 59 at this portion so as to cover the air outlet 43 in the condition where a predetermined gap G1 is defined between the transmission case cover 46 and the transmission case 59. The air outlet 43 is in communication with the cooling air inlet 59b through a gap G2 defined between a stator 84 and a rotor 83 of the driving motor 21b. Accordingly, the cooling air introduced from the cooling air inlet 59b is passed through gap G2 between the stator 84 and the rotor 83 of the driving motor 21b to thereby cool the driving motor 21b. Thereafter, the cooling air passed through gap G1 is discharged from the air outlet 43 to the outside of the transmission case 59.

Figure 6:
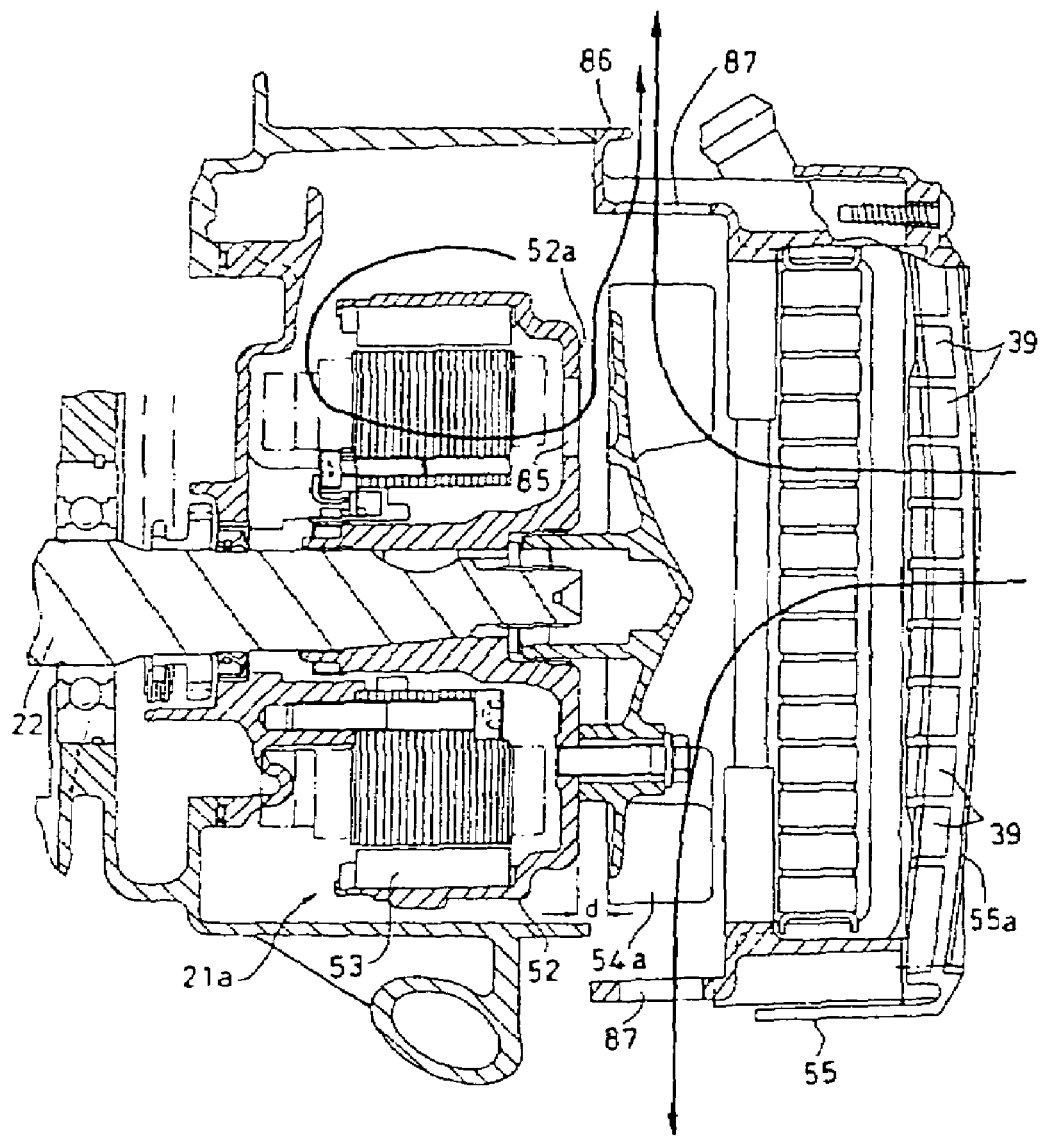
FIG. 6 is an enlarged view of an essential part shown in FIG. 3.

Referring to FIG. 6, the yoke 52a of the outer rotor 52 in the ACG starter motor 21a is formed with a vent hole 85. Reference numeral 86 denotes a motor case having on the side surface thereof an air outlet 87. When the fan 54a is rotated in synchronism with the ACG starter motor 21a, an outside cooling air is introduced from the cooling air inlet 39 formed through the side surface 55a of the cover 55, thereby cooling the ACG starter motor 21a. Thereafter, the cooling air is discharged from the air outlet 87 to the outside of the vehicle. Further, a predetermined gap G1 is defined between the yoke 52a of the outer rotor 52 and the fan 54a opposed to each other. Accordingly, the outside cooling air introduced from the cooling air inlet 39 and cooled the ACG starter motor 21a is passed through the vent hole 85 of the yoke 52a and the predetermined gap d between the yoke 52a and the fan 54a to the air outlet 87. With this arrangement, the ACG starter motor 21a can be efficiently cooled.

In this preferred embodiment, the cooling air introduced from the cooling air inlet 59b into the transmission case cover 59a is discharged from the air outlets 42 and 43. As a modification, the air outlet 42 may be closed. In this case, all of the cooling air introduced into the transmission case cover 59a is discharged from the air outlet 43.

In the case when all of the cooling air introduced into the transmission case cover 59a is discharged from the air outlet 43 as mentioned above, the amount of the cooling air to be supplied to the driving motor 21b can be increased to thereby cool the driving motor 21b more efficiently.

As another modification, the air outlet 42 may be covered with a lid adapted to be opened or closed by a heat sensitive member, for example, a bimetal. In this case, when the temperature inside the transmission case cover 59a is less than or equal to a predetermined temperature, the air outlet 42 is closed, whereas when the temperature inside the transmission case cover 59a becomes greater than the predetermined temperature, the air outlet 42 is opened.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor cooling structure for an electric vehicle, comprising:
    a driving motor connected to a drive wheel;
    a power unit case accommodating said driving motor and a power transmitting mechanism therefor;
    a first air inlet for introducing an outside air as a cooling air into said power unit case; and
    an air outlet provided in the vicinity of said driving motor, wherein said air inlet and said air outlet are in communication with each other through a gap G2 between a stator and a rotor of said driving motor,
    wherein said power unit case also accommodates:
    a continuously variable transmission having a drive pulley, a driven pulley, and an endless belt wrapped between said drive pulley and said driven pulley, the driving motor being disposed on a side of said driven pulley,
    an air intake fan provided coaxially with said drive pulley; and
    a drive shaft coaxially connecting said driving motor and said driven pulley,
    wherein said air inlet is provided in the vicinity of said air intake fan.

2. A motor cooling structure for an electric vehicle according to claim 1, wherein said air outlet is located in a projected area of said driving motor as viewed in side elevation of said vehicle.

3. A motor cooling structure for an electric vehicle according to claim 2, further comprising a cover member for covering said air outlet with a predetermined gap G1 defined therebetween.

4. A motor cooling structure for an electric vehicle according to claim 1, further comprising a cover member for covering said air outlet with a predetermined gap G1 defined therebetween.

5. A motor cooling structure for an electric vehicle according to claim 1, wherein the air outlet is a first air outlet, and wherein a second air outlet is also provided, and one of the first air outlet and the second air outlet being adapted to open and close depending on a temperature inside the power unit case.

6. A motor cooling structure for an electric vehicle according to claim 1, wherein at least a portion of the second air outlet being disposed rearward of the air inlet and forward of the first air outlet.

7. A motor cooling structure for an electric vehicle according to claim 1, wherein an air intake fan is provided coaxially with said drive pulley on a crankshaft of an internal combustion engine.

8. A motor cooling structure for an electric vehicle, comprising:
   a motor having a stator and an outer rotor arranged around said stator;
   a fan coaxially connected to said outer rotor in axially opposed relationship with a yoke of said outer rotor; and
   a predetermined gap d being defined between said yoke and said fan, wherein said yoke of said outer rotor is formed with a vent hole.

9. A motor cooling structure for an electric vehicle according to claim 8, wherein the motor is a starter motor and generator.

10. A motor cooling structure for an electric vehicle according to claim 8, wherein the fan and the outer rotor are mounted on a crankshaft of an internal combustion engine.

11. A motor cooling structure for an electric vehicle according to claim 8, wherein the vent hole is disposed between the stator and the fan.

12. A motor cooling structure for an electric vehicle, comprising:
   a driving motor connected to a drive wheel;
   driving motor,
   wherein said air inlet and said air outlet are in communication with each other through a gap between a stator and a rotor of said driving motor;
   a power unit case accommodating said driving motor and a continuous variable transmission;
   an air inlet for introducing an outside air as a cooling air into said power unit case; and
   an air outlet provided in the vicinity of said driving motor,
   wherein said air inlet and said air outlet are in communication with each other through a gap G2 between a stator and a rotor of said driving motor,
   wherein said power unit case also accommodates:
   a continuously variable transmission having a drive pulley, a driven pulley, and an endless belt wrapped between said drive pulley and said driven pulley, the driving motor being disposed on a side of said driven pulley,
   an air intake fan provided coaxially with said drive pulley; and
   a drive shaft coaxially connecting said driving motor and said driven pulley,
   wherein said air inlet is provided in the vicinity of said air intake fan.

13. A motor cooling structure for an electric vehicle according to claim 12, wherein said air outlet is located in a projected area of said driving motor as viewed in side elevation of said vehicle.

14. A motor cooling structure for an electric vehicle according to claim 13, wherein said air inlet is provided in the vicinity of said air intake fan.

15. A motor cooling structure for an electric vehicle according to claim 12, further compring a cover member for covering said air outlet with a predetermined gap defined therebetween.

16. A motor cooling structure for an electric vehicle according to claim 12, wherein the air intake fan is adapted to air cool both drive pulley and the driven pulley.

17. A motor cooling structure for an electric vehicle according to claim 12, wherein an air intake fan is provided coaxially with said drive pulley on a crankshaft of an internal combustion engine.

* * * * *